Dec. 8, 1953  S. G. MALBY  2,661,560
PICTURE DISPLAY DEVICE
Filed July 18, 1949  2 Sheets-Sheet 1
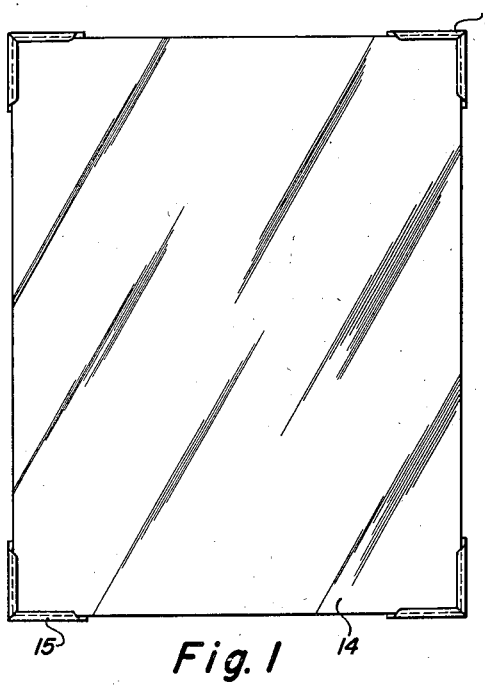
Fig. 1
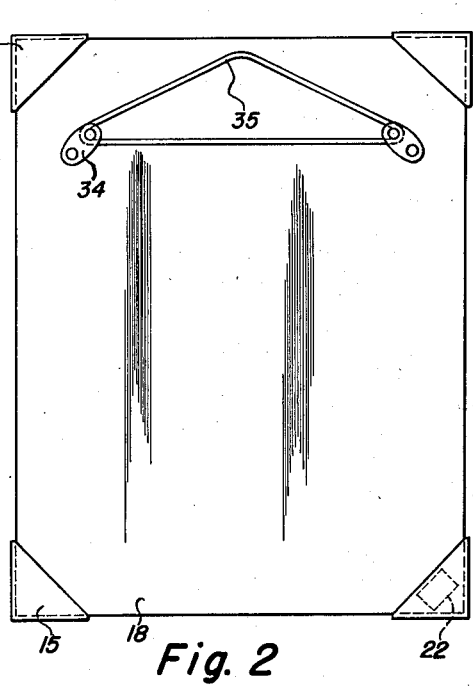
Fig. 2
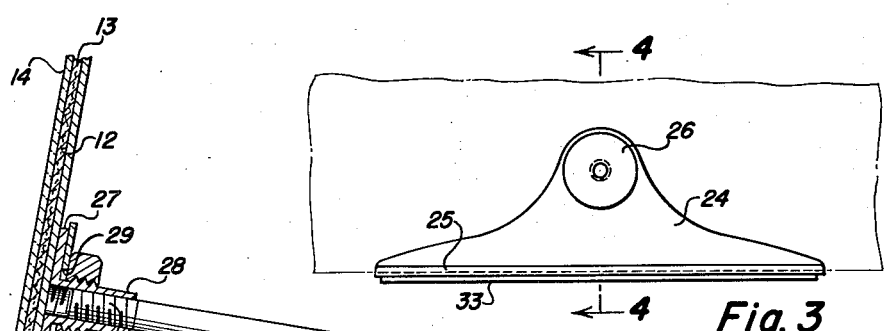
Fig. 3
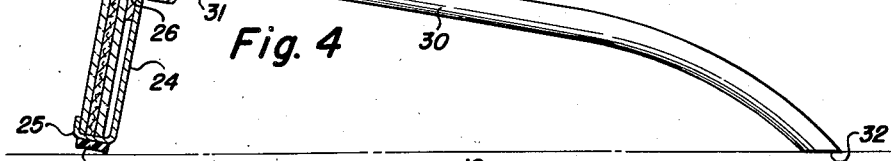
Fig. 4
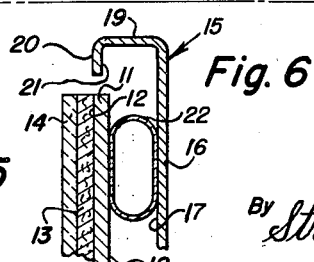
Fig. 5
Fig. 6
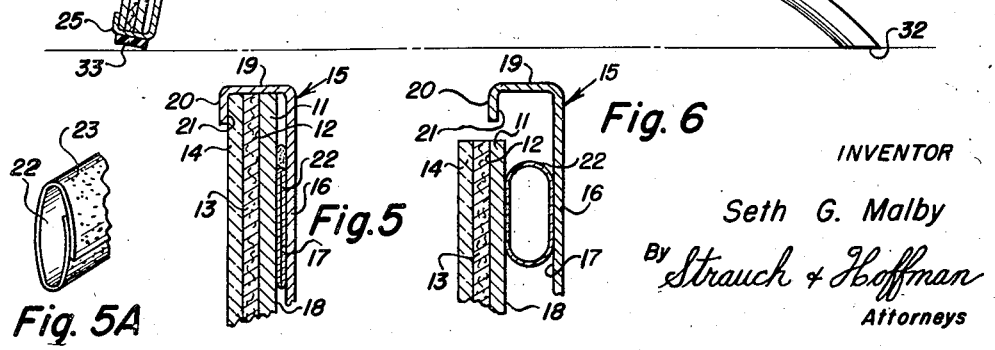
Fig. 5A
INVENTOR
Seth G. Malby
By Strauch & Hoffman
Attorneys Dec. 8, 1953  S. G. MALBY  2,661,560
PICTURE DISPLAY DEVICE
Filed July 18, 1949  2 Sheets-Sheet 2
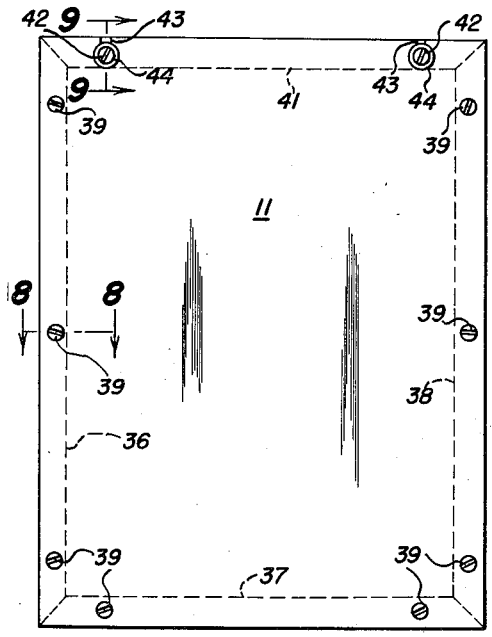
Fig. 7
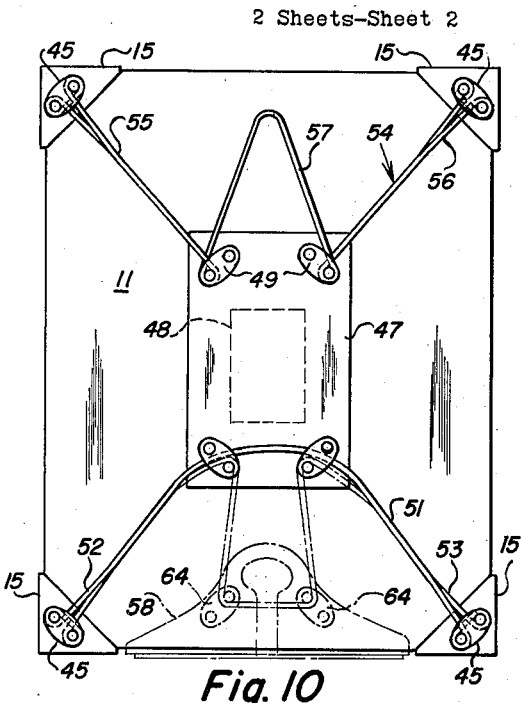
Fig. 10
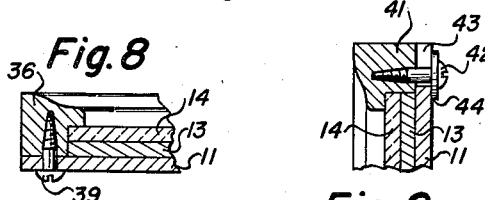
Fig. 8    Fig. 9
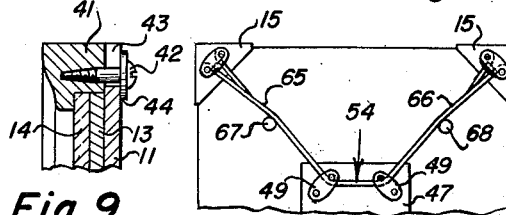
Fig. 17
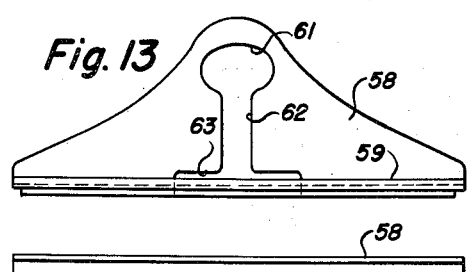
Fig. 13
Fig. 14
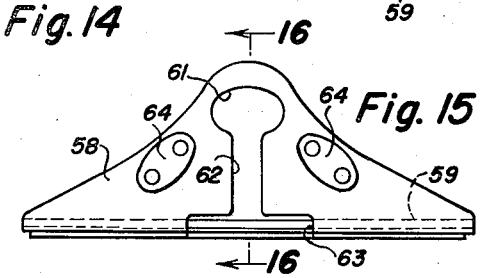
Fig. 15
Fig. 16
Fig. 12
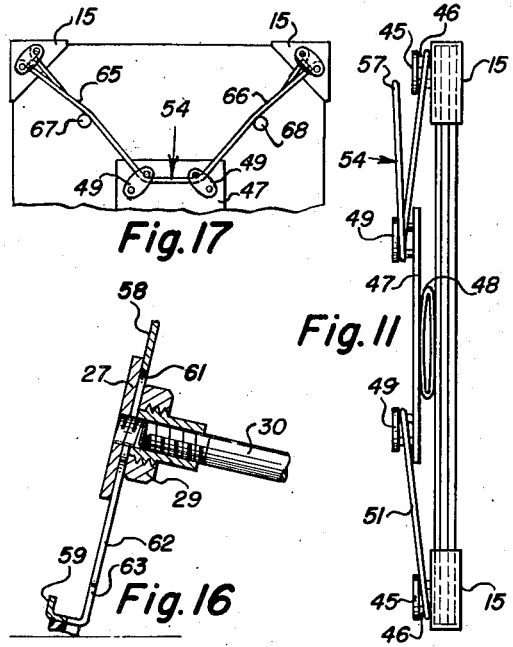
Fig. 11
INVENTOR
Seth G. Malby
By Strauch & Hoffman
Attorneys Patented Dec. 8, 1953

2,661,560

UNITED STATES PATENT OFFICE 2,661,560

PICTURE DISPLAY DEVICE

Seth G. Malby, Edgewater, N. J.

Application July 18, 1949, Serial No. 105,366

1 Claim. (Cl. 40—155)

This invention relates to picture, mirror and like mounting and display devices and particularly to such devices wherein the picture or mirror is supported on a rigid full surface backing member which is the main structural member of the device.

The usual picture or photograph mount comprises a frame having a central rectangular or otherwise shaped opening around which is formed a relatively narrow ledge on which the periphery of the picture sheet, or a glass plate in front of the picture, is seated. A separate backing member is then mounted on the frame to enclose the picture and hold it on its seat as well as to keep out dust. This usual backing member may be a sheet of cardboard, paper or the like and it has no structural or supporting function in the device.

In the present invention I have provided an extremely efficient, attractive, and mechanically simple picture display device wherein a rigid flat backing member is the main structural part of the device and the picture or other sheet to be displayed is fully backed by that member and releasably retained so that exchange of pictures is facilitated. In one embodiment of the invention a special cradle arrangement is provided whereby the weight of the picture or other article suspended in it increases the holding effort of the cradle.

It is the major object of the present invention to provide a novel picture mounting and display device wherein the backing member for the picture serves as the chief structural member of the mount.

It is a further object of my invention to provide a novel mounting and display device having a rigid flat backing member for the picture, mirror or other article and novel releasable means for holding them together. In the preferred embodiment a glass plate overlying the picture is held in the assembly.

A further object of my invention is to provide a novel friction device for holding a rigid backing plate and picture in assembly.

It is a further object of my invention to provide a novel support or easel for association with the article mount of the invention.

A further object of the invention is to provide a novel cradle for suspending a picture or mirror mount or other article wherein the weight of the article increases the retaining grip of the cradle on the article.

Further objects of the invention will appear as the description proceeds in connection with the appended claim and the annexed drawings wherein:

Figure 1 is a front elevation of a picture mounting and display device according to a preferred embodiment of my invention;

Figure 2 is a rear elevation of the device of Figure 1;

Figure 3 is a front elevation of a suitable support or easel for the device of Figures 1 and 2;

Figure 4 is a section substantially on line 4—4 of Figure 3 also illustrating the manner in which the picture mount is disposed on the support;

Figure 5 is an enlarged section illustrating the manner in which at least two corner members of Figure 1 are preferably associated with the backing member and the front glass plate in the picture mount in the assembly;

Figure 5A is a perspective view of the fastening means between the corner member and the backing plate;

Figure 6 is similar to Figure 5 but illustrates the member of Figure 5 in the position it is displaced to permit disassembly or assembly of the picture, front glass plate and backing member.

Figure 7 is a rear elevation of a picture mount according to a further embodiment of the invention wherein the picture sheet and glass plate are removable only through one side of the assembly;

Figure 8 is a section on line 8—8 of Figure 7 illustrating further details of the assembly;

Figure 9 is a section along line 9—9 of Figure 7 illustrating the interfit of the backing plate and the removable side strip;

Figure 10 is a rear elevation of a further embodiment of the invention wherein a novel cradle arrangement is provided;

Figure 11 is a side elevation of the assembly of Figure 10;

Figure 12 is a fragmentary side elevation illustrating one of the rivet projections for attaching the cradle;

Figure 13 is a front elevation of a further easel embodiment having a slotted support attachment;

Figure 14 is a top plan view of the easel of Figure 13;

Figure 15 is a rear elevation of the easel of Figure 13;

Figure 16 is a section on line 16—16 of Figure 15; and

Figure 17 is a fragmentary rear elevation illustrating the cradle assembly on a double wall hanger arrangement.

The invention comprises essentially a picture display and mounting device including a rigid backing member 11, which is preferably a stiff non-bendable sheet of aluminum or some like metal having an uninterrupted flat smooth front surface 12 upon which may be laid the picture adapted to be displayed. The picture, for example, may be printed or otherwise formed on the front surface of a flat sheet of paper, cardboard or the like indicated at 13 and laid upon surface 12, and preferably a flat smooth front glass plate 14 of suitable thickness, which is preferably coextensive with stiff backing plate 11, overlies the front surface of the picture sheet 13.

This assembly of the rigid backing member, picture sheet and front transparent glass plate is held in assembly in the preferred embodiment of the invention by novel corner members, each corner member being indicated at 15 and shown in detail in Figures 5 and 6. Preferably backing member 11, sheet 13 and glass plate 14 are all of the same peripheral dimensions.

Each corner member 15 comprises a substantially triangular plate 16 having a flat smooth inner surface 17 parallel to the flat smooth rear surface 18 of backing plate 11. Plate 16 is integrally formed coextensively with the adjacent edges of the backing plate with forwardly extending flanges 19 that terminate in inwardly projecting short lips 20, thereby providing a channel formation enclosing and embracing the adjacent peripheries of the backing member, picture sheet and glass plate. The inner surface 21 of each lip 20 is smooth and extends in full surface engagement over the adjacent surfaces of the glass plate, mirror or other article mounted in the device. Where the supported article is a mirror its rear surface will be fully backed by plate 11 and the corner members extend over the front surface of the mirror which is usually beveled so that lip 20 is disposed at an angle.

Each corner member is preferably an integral element made from a single piece of light gauge aluminum or some metal having sufficient springiness to fit over the edge of the assembly when the latter is slightly thicker than the distance between surfaces 17 and 21. In actual practice the distance between surfaces 17 and 21 is accurately preformed and set to substantially the combined thickness of the backing member, picture sheet and glass plate, and when the members 15 are placed on the corners of the assembly they bind the elements of the assembly together.

Interposed between each surface 17 of at least two corner members and the rear flat surface 18 of backing plate 11 is a suitable fastening means capable of permitting adequate displacement between the positions illustrated in Figures 5 and 6 for assembly or disassembly of the picture mount. In the preferred embodiment of the invention, this fastening means comprises an endless flexible strip 22 which has its outer face 23 coated with an adhesive which will stick to a smooth metal surface. The pressure sensitive adhesive tape known as Scotch tape has been found suitable for this purpose, and the endless strip 22 may be formed simply by flexing a length of such adhesive coated tape into a loop with its adhesive side outside and with its ends adhesively attached together.

As illustrated in Figure 5, when the corner members are in position to hold the backing plate, picture and glass front plate together in tight assembly, the endless fastening strip 22 is substantially flat with its non-adhesive coated surface portions, which are smooth and relatively slippery, pressed against each other and with all of its adhesive coated area except the small portion at the end bends tightly adhering to either the back surface of member 11 or the surface 17. The space between surfaces 17 and 18 is shown exaggeratedly in Figure 5 for purposes of illustration, but it will be understood that this space is really very small, in the actual assembly being equal only to the double thickness of the fastening tape 22.

When it is desired to remove the picture sheet 13 from the device, it is necessary only to slidably displace two or more adjacent corner members 15 outwardly until their channels are clear of the outer edges of the assembly. To do this, it will be observed that this action is effected by simply exerting finger pressure for sliding the corner member 15 outwardly along the backing plate 11 with sufficient force to cause the outer side of the flat adhesive fastening loop to peel or strip from surface 17. As corner member 15 moves outwardly, it will be appreciated that the inner side of the loop will similarly peel or strip from surface 18 and the loop undergoes a substantially rolling action during which opposite adhesive surfaces of the loop are transferred between surfaces 17 and 18.

As soon as the corner member 15 is so moved outwardly far enough to clear surface 21 from the glass plate, finger pressure on the corner clamp may be relieved and the inherent flexibility of the strip material of the loop causes or permits the hitherto flattened loop (Figure 5) to expand or be expanded and thus displace the entire corner member rearwardly with respect to the assembly to assume the position of Figure 6 where it is clear of the edges of the assembly although still attached and permits disassembly of the glass plate and picture sheet.

As above stated only two adjacent corner members 15 need be so flexibly attached to the plate 11, for example at the two upper corners, and the other two members 15 may be secured rigidly to plate 11 as by rivets.

It will be appreciated that the flexible loops at the displaceable corners may be replaced by mechanical connections affording the same movement of the corner members, without departing from the spirit of the invention.

The assembly may be restored to the position of Figure 5 simply by moving members 15 inwardly, the adhesive fastening loop simply rolling reversely during the action.

It will be understood that while this is a preferred method of clamping the assembly together, other suitable equivalent means may be embodied without departing from the spirit of the invention.

Figures 3 and 4 illustrate a support easel for the above picture mount assembly. This comprises a sheet metal plate 24, of aluminum preferably, which has its lower edge integrally turned up to provide a channel 25 in which the lower edge of the assembly is adapted to seat with the flat back surface of member 11 adapted to lie flush upon a flat support surface 26 that is arranged at a small angle to the vertical. In the illustrated support, surface 26 is formed on the front flange 27 of a stud 28 that extends through a horizontally centered aperture in plate 24 and is secured thereto by a nut 29. A rod 30 having its front end 31 threaded in stud 28 projects rearwardly and downwardly and is formed at its rear with a table engaging horizontal flat surface portion 32.

The picture mount above described thus comprises a backing member which also serves as the main and only structural member, the other parts being secured thereto. This backing member not only carries the other parts, but the arrangement inhibits entry of dust into the assembly from the rear, and the tight assembly prevents entry of dust through the peripheral edges of the assembly. In some embodiments the glass front plate may be omitted and the members may secure the picture sheet and backing member 11 together as above described.

When the assembled picture mount of Figures 1 and 2 is placed on the support, it will be appreciated that the mount is located at a small angle to the vertical, about 10 degrees preferably, and that it is retained on the support by the combined action of channel 25 and surface 26. Channel 25 is preferably just shorter in length to the distance between the bottom corner members 15. Rod 30 retains the support and assembly in the illustrated position and there is no tendency to tip because the whole assembly is balanced with the projected center of gravity of the mount falling within the triangular area defined by the ends of channel 25 and rod end 32. Preferably a layer 33 of rubber or like anti-friction material may be employed on the bottom of channel 25 and on rod end 32 to engage the table top to prevent accidental skidding along the table top and to prevent table abrasion.

The easel of Figures 3 and 4 is of course adapted to receive a table mirror mounted as above, as well as a picture and glass plate assembly.

While I have disclosed an assembly wherein the picture mount comprises only three elements, the rigid backing member, the picture sheet itself and a front glass plate, only two elements in the case of a mirror, the backing member and the glass mirror plate, it will be appreciated that a mat may be provided overlying the front of the picture in accordance with usual picture mounting practice. Also should the picture sheet be a paper sheet small in thickness as compared to the channel dimensions of the clamps, or the mirror be thin, a filler sheet of cardboard or the like of suitable thickness may be employed between the back surface of the picture sheet or mirror and backing member 11 to obtain the desired fit at the corners. Reference to the picture sheets and mirrors includes such mats or fillers.

As illustrated in Figure 2, if desired rigid rivets 34 may be provided on the back of member 11 coating with a flexible wire 35 for hanging the assembly on a wall hook.

In the embodiment of the invention illustrated in Figures 7-9, the rigid backing member 11, picture sheet 13 and glass plate 14 are essentially the same as previously described. However, three sides of the assembly are permanently bounded by side strips 36, 37 and 38 attached to the backing plate 11 as by screws 39. For some assemblies the strips 36—38 may comprise an integral U-shaped member. As illustrated in Figure 8, these strips 36—38 have the appearance of the usual picture frame molding.

The top of the assembly may be closed by a separate strip 41 of the same size and shape as strip 37 having beveled ends mating with the upper ends of strips 36 and 38.

As illustrated in Figure 9, two screws 42 project rearwardly from strip 41 and enter into slots 43 in the upper edge of backing plate 11 when the strip 41 is in place on the assembly. Washers 44 engaged with the headed ends of screws 42 prevent the screws from pulling through the slots and also serve as shims to tighten the strip 41 upon the assembly, or screws 42 may be tightened to secure strip 41 to the backing plate.

The assembly of Figures 7-9 is mounted on the wall as by a suspension like that shown on the back of the plate in Figure 2.

Figures 10-12 illustrate a novel cradle arrangement that may support the picture or mirror mount of Figures 1-6, for example, or may be adapted to support other articles such as ornamental plates and placques, possibly with some changes in shape but without departing from the spirit of the invention.

The backing member 11 is here illustrated as provided with four corner members 15 which are the same as those of Figures 1-6, and all are attached to the member 11 by flexible loops 22 in the manner heretofore described.

Each corner member 15, in this embodiment of the invention, is provided with a fixed rivet projection best illustrated in Figure 12 as a flat oval button 45 spaced from the member on rigid two legs 46. In the assembly each of these rivets is so arranged that a line connecting legs 46 is substantially perpendicular to the diagonal at that corner for a purpose to appear.

A flat block 47 is flexibly and slidably mounted on the back of plate 11, as by the endless adhesive loop 48 which is like loops 22 at the corners. The loops 22 at the corners permit diagonal displacement of the corner members 15, while loop 48 permits only vertical displacement of block 47 along plate 11.

The back of block 47 has rigidly secured to it four rivets 49 that are shaped as in Figure 12, each in a corner of the block. As illustrated in Figure 10, a flexible cord or wire 51 passes through the lower two rivets 49, which are at the same vertical level, and is formed at opposite ends with loops 52 and 53 secured to lower rivets 45 on the lower corner members.

A second flexible cord or wire 54, longer than cord 51, has opposite end loops 55 and 56 secured over the upper corner member rivets 45, with an intermediate free loop 57 that is formed by slidably passing the cord section from each loop straight between the legs of adjacent upper block rivet 49 and then outwardly under the lower leg and upwardly to be joined in free loop 57.

It will be seen therefore that when the assembly is suspended by free loop 57 on a wall hook the weight of the assembly acting through cords 51 and 54 will act to draw corner members 15 more tightly into engagement with the backing plate, the cradle formed by cords 51, block 47 and members 15 providing a substantially diagonal force acting on each corner member. Block 47 will automatically shift vertically on loop 48 to readjust itself until all four of the diagonal forces are substantially equal.

The two diagonally directed sides of cord 51 are in tension because of the downward pull of lower corner members 15. The two diagonally directed sides of cord 54 are in tension because of the downward pull of the weight of the assembly on block 47, as illustrated in Figure 10.

Figures 13-16 illustrate a modified table easel that is adapted for disassembly to coact with the cradle of Figures 10-12. This easel is similar in appearance to that of Figures 3 and 4, comprising a sheet metal plate 58 formed with a bottom channel 59. Plate 58 is formed with a stud receiving aperture 61 like plate 24 of Figure 4 and in addition is formed with a vertical slot 62 that intersects a horizontal slot 63 which is formed at the juncture of plate 58 and the channel and is wide enough to permit the stud front flange 27 to be slipped therethrough for quickly separating the rod and stud assembly from plate 58 by merely loosening but not uncoupling nut 29.

As illustrated in Figure 15, two rivets 64 are rigid with the back of plate 58 on the side opposite channel 59. These rivets are equally spaced on opposite sides of the center of the easel and have no function when the device is used as a table support.

It is usually desirable that mirrors be supported at two points on the wall in practice. The above described cradle is admirably adapted for this as illustrated in Figure 17. Instead of being long enough for the central loop 57 of Figure 10, the upper cord or wire 54 simply is threaded through the upper two rivets 49 thereby providing straight oppositely inclined lengths of cord 65 and 66 which, as illustrated, engage the spaced wall hangers 67 and 68 respectively that are on the same horizontal level.

The weight of the assembly exerts a wedging action which tends to seat it more securely on the hangers, and the cord lengths 65 and 67 are under tension so that the upper corner members 15 are drawn into closer assembly with the supported article. This two support arrangement, as above pointed out, is especially useful for mirrors.

It will be noted that the above described cradle may be hung to support the article with either the short or long side horizontal merely by rearranging the cords.

As above is clear, the embodiment of Figures 1 and 2 may be adapted for heavier pictures by using the cradle of Figures 10–12. This latter embodiment may be adapted for added support of heavy pictures by detaching the plate and channel unit of Figure 16 and applying it to the bottom of the assembly in Figure 10, as illustrated in phantom lines, a sufficiently long cord being provided to have a depending middle loop threaded through rivets 64. Thus the support of the assembly is distributed along its lower edge, which results in a more stable arrangement.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A cradle for suspending a rigid substantially rectangular plate assembly comprising four corner embracing elements displaceably secured to said plate assembly, a substantially central member slidably secured to the back of said plate assembly, a flexible cord secured at opposite ends to the lower two corner elements and slidably connected to said member, a second flexible cord having its opposite ends secured to the upper two corner elements and slidably passing over two fixed parts of said member and having a loop disposed between said two fixed parts whereby the assembly may be suspended with the weight of the article placing the cords in tension so as to increase the holding effort of said corner elements.

SETH G. MALBY.

References Cited in the file of this patent

UNITED STATES PATENTS

| Number | Name | Date |
| --- | --- | --- |
| 560,465 | Bostwick | May 19, 1896 |
| 1,441,071 | Edmonds | Jan. 2, 1923 |
| 2,209,972 | Horwitt | Aug. 6, 1940 |

FOREIGN PATENTS

| Number | Country | Date |
| --- | --- | --- |
| 581,559 | Great Britain | Oct. 16, 1946 |